US011091993B2

(12) United States Patent
Sizemore et al.

(10) Patent No.: US 11,091,993 B2
(45) Date of Patent: Aug. 17, 2021

(54) ZIPPER BRIDGE

(71) Applicant: OIL STATES ENERGY SERVICES, L.L.C., Houston, TX (US)

(72) Inventors: Richard Brian Sizemore, White Oak, TX (US); Bob McGuire, Meridian, OK (US); Danny L. Artherholt, Asher, OK (US); Mickey Claxton, Oklahoma City, OK (US); Blake Mullins, Edmond, OK (US); Charles Beedy, Oklahoma City, OK (US)

(73) Assignee: Oil States Energy Services, L.L.C., Houston, TX (US)

( * ) Notice: Subject to any disclaimer, the term of this patent is extended or adjusted under 35 U.S.C. 154(b) by 19 days.

(21) Appl. No.: 16/702,301

(22) Filed: Dec. 3, 2019

(65) Prior Publication Data

US 2020/0393088 A1    Dec. 17, 2020

Related U.S. Application Data

(63) Continuation-in-part of application No. 16/443,639, filed on Jun. 17, 2019, now Pat. No. 10,570,692.

(51) Int. Cl.
*E21B 43/26* (2006.01)
*F17D 5/00* (2006.01)
*E21B 43/267* (2006.01)
*G05D 7/06* (2006.01)

(52) U.S. Cl.
CPC ........ *E21B 43/2607* (2020.05); *E21B 43/267* (2013.01); *F17D 5/00* (2013.01); *G05D 7/0641* (2013.01)

(58) Field of Classification Search
CPC .... E21B 43/2607; E21B 43/267; E21B 33/03; E21B 33/068; F17D 5/00; G05D 7/0641; G05D 7/01; F16L 41/03; F16K 3/314; F16K 3/24; F16K 31/122
See application file for complete search history.

(56) References Cited

U.S. PATENT DOCUMENTS

| 969,358 A | 9/1910 | Goodall |
|---|---|---|
| 1,301,243 A | 4/1919 | Ford |
| 1,334,007 A | 3/1920 | White |
| 1,471,045 A | 10/1923 | Maupin et al. |

(Continued)

FOREIGN PATENT DOCUMENTS

NL    7611253    4/1978

OTHER PUBLICATIONS

PCT, International Search Report and Written Opinion; PCT/US19/64283, dated Feb. 26, 2020.

(Continued)

*Primary Examiner* — Brad Harcourt
(74) *Attorney, Agent, or Firm* — Morgan, Lewis & Bockius LLP

(57) ABSTRACT

A frac zipper manifold bridge connector comprises two bridge spools for connecting a well configuration unit of a frac zipper manifold to a frac tree of a wellhead. The connector comprises multiple connections involving threaded flanges, such that the orientation of the bridge spools may be adjusted to ensure that they are correctly aligned with the frac tree. The bridge connector further comprises one or more flow diverters to decrease turbulence and reduce erosion.

14 Claims, 16 Drawing Sheets

(56) References Cited

U.S. PATENT DOCUMENTS

| | | | |
|---|---|---|---|
| 2,143,568 A | 1/1939 | Munro | |
| 2,359,846 A | 10/1944 | Hayman | |
| 2,390,445 A | 12/1945 | Merder | |
| 2,533,097 A | 12/1950 | Dale | |
| 4,252,348 A | 2/1981 | Kojima | |
| 4,436,325 A | 3/1984 | Miller | |
| 6,106,024 A | 8/2000 | Herman et al. | |
| 6,471,249 B1 | 10/2002 | Lewis | |
| 8,777,274 B2 | 7/2014 | Chou | |
| 8,839,867 B2 | 9/2014 | Conrad | |
| 8,978,763 B2 | 3/2015 | Guidry | |
| 8,991,873 B2 | 3/2015 | Weinhold | |
| 9,068,450 B2 | 6/2015 | Guidry | |
| 9,222,345 B2 | 12/2015 | Conrad | |
| 9,255,469 B2 | 2/2016 | Conrad | |
| 9,518,430 B2 | 12/2016 | Guidry | |
| 9,631,469 B2 | 4/2017 | Guidry et al. | |
| 9,903,190 B2 | 2/2018 | Conrad et al. | |
| 9,915,132 B2 | 3/2018 | Conrad | |
| 9,932,800 B2 | 7/2018 | Guidry | |
| 10,094,195 B2 | 10/2018 | Guidry | |
| 10,132,146 B2 | 11/2018 | Guidry | |
| 2006/0197342 A1 | 9/2006 | Yen | |
| 2007/0251578 A1 | 11/2007 | McGuire | |
| 2009/0114392 A1 | 5/2009 | Tolman et al. | |
| 2009/0145597 A1* | 6/2009 | Cherewyk | E21B 33/068 166/177.5 |
| 2009/0194273 A1 | 8/2009 | Surjaatmadja et al. | |
| 2009/0261575 A1 | 10/2009 | Bull et al. | |
| 2012/0181015 A1 | 7/2012 | Karjaria et al. | |
| 2013/0032328 A1 | 2/2013 | Guidry et al. | |
| 2013/0075080 A1 | 3/2013 | Guidry | |
| 2013/0175039 A1 | 7/2013 | Guidry | |
| 2014/0352968 A1 | 12/2014 | Pitcher et al. | |
| 2015/0047714 A1 | 2/2015 | Doig | |
| 2016/0115773 A1 | 4/2016 | Conrad et al. | |
| 2017/0198548 A1* | 7/2017 | Dickinson | E21B 43/26 |
| 2017/0350223 A1 | 12/2017 | Guidry et al. | |
| 2017/0370172 A1 | 12/2017 | Tran et al. | |
| 2017/0370199 A1* | 12/2017 | Witkowski | F16K 31/126 |
| 2018/0179848 A1* | 6/2018 | Cherewyk | E21B 21/02 |
| 2018/0187537 A1 | 7/2018 | Hill et al. | |
| 2018/0284816 A1 | 10/2018 | Cook et al. | |
| 2018/0291718 A1 | 10/2018 | Conrad et al. | |
| 2018/0298735 A1 | 10/2018 | Conrad | |
| 2019/0040707 A1 | 2/2019 | Guidry | |
| 2019/0093444 A1 | 3/2019 | Guidry | |

OTHER PUBLICATIONS

Trigger Energy, Where Integrity Meets Innovation!, Wellhead & Fracturing Equipment, WEBS ITE: https://trigger-energy.com/#equipment—Jun. 17, 2019—© Trigger Energy Inc. 2018. All Rights Reserved.

Schlumberger; Monoline Flanged-Connection Fracturing Fluid Delivery Technology, WEBSITE: https://www.slb.com/services/completions/stimulation/cameron-fracturing-services-equiment/monoline-technology.aspx—Jun. 17, 2019 © 2019 Schlumberger Limited. All rights reserved.

\* cited by examiner

ZIPPER BRIDGE

TECHNICAL FIELD

The present disclosure relates generally to oil or gas wellbore equipment, and, more particularly, to a connector bridge for a frac manifold.

BACKGROUND

Frac manifolds, also referred to herein as zipper manifolds, are designed to allow hydraulic fracturing operations on multiple wells using a single frac pump output source. Frac manifolds are positioned between the frac pump output and frac trees of individual wells. A frac manifold system receives fracturing fluid from the pump output and directs it to one of many frac trees. Fracturing fluid flow is traditionally controlled by operating valves to isolate output to a single tree for fracking operations.

Frac zipper manifolds may be rigged up to frac trees before frac equipment arrives at the well site. Once onsite, the frac equipment need only be connected to the input of the frac manifold. Because individual frac trees do not need to be rigged up and down for each fracking stage and because the same frac equipment can be used for fracking operations on multiple wells, zipper manifolds reduce downtime for fracking operations while also increasing safety and productivity. Another benefit includes reducing equipment clutter at a well site.

Despite their benefits, further efficiencies and cost savings for zipper manifolds may be gained through improved designs. In particular, typically treatment fluid in the zipper manifold passes to frac trees via goat heads or frac heads and frac iron, but there are several drawbacks to using such setups to span the distance between the zipper manifold and each frac tree. Goat heads, or frac heads, traditionally employ multiple downlines and restraints that clutter the area between the zipper manifold and the frac tree, which can make for a more difficult and less safe work environment to operate and maintain the frac equipment.

Some designs have been developed to avoid using frac iron. One design uses a single line made from studded elbow blocks and flow spools with swiveling flanges. Such a design is disclosed in, for example, U.S. Pat. Nos. 9,932,800, 9,518,430, and 9,068,450. A similar design is currently offered for sale by Cameron International of Houston, Tex., under the brand name Monoline. One drawback of this design is that the weight of the equipment combined with the potentially awkward orientation of the lines can make installation difficult and can place uneven or increased stress on the connections to the frac manifold and/or the frac tree. Another drawback is that using a single line to connect the frac manifold to the frac tree can lead to increased velocity and turbulence of the flow, when compared to using multiple lines. Such conditions may lead to a greater risk of erosion in the frac tree. Replacing a damaged frac tree can be very expensive and time-consuming. Accordingly, what is needed is an apparatus, system, or method that addresses one or more of the foregoing issues related to frac zipper manifolds, among one or more other issues.

SUMMARY OF THE INVENTION

The frac zipper manifold uses a dual passage bridge to connect from a zipper manifold to a frac tree. With this bridge design, multiple frac iron lines between the zipper manifold and the frac tree are eliminated while providing for a robust, durable connection which may be adjusted to accommodate different configurations of zipper manifolds and frac trees.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Figure 1:
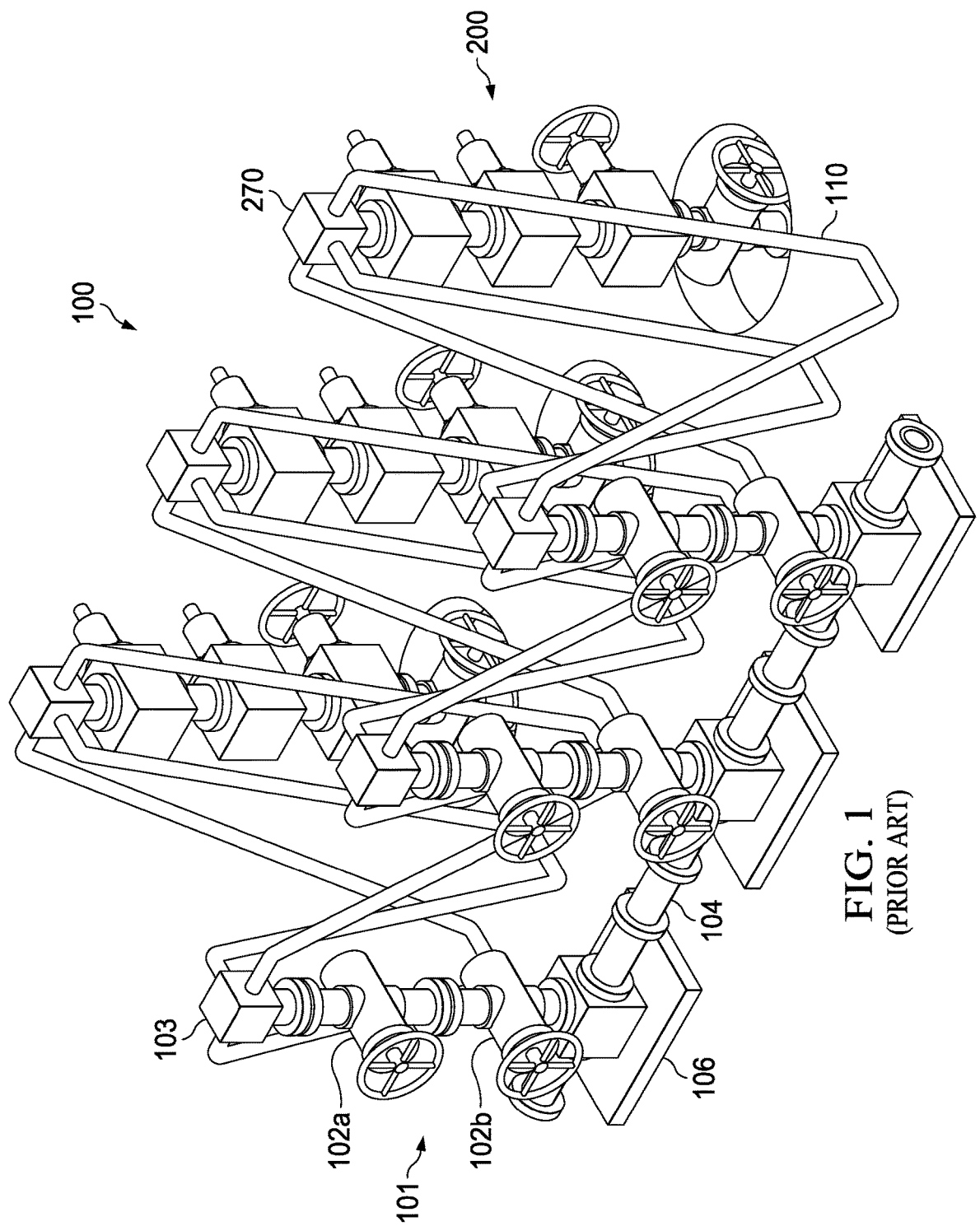
FIG. 1 illustrates a zipper manifold as known in the prior art.

FIG. 1 illustrates an example of a prior art zipper manifold 100. The manifold may be positioned vertically, as shown in FIG. 1, or it may be positioned horizontally. The frac manifold 100 can include two or more well configuration units 101. Each well configuration unit 101 includes one or more valves 102 and a connection header 103, and the well configuration units 101 may be collectively or individually (as shown) positioned on skids 106. Each connection header 103 connects to a similar header on the frac tree. Prior art connection headers 103 are often called frac heads or goat heads and include multiple fluid connection points, as shown in FIG. 1. Each fluid connection point attaches to a downline 110 that is routed to the ground before turning back up and connecting to a connection point on the frac tree header 270 of the frac tree 200. The use of downlines 110 allows operators to adjust for different distances between and relative locations of the frac manifold 100. The downlines 110 typically have small diameters, which limits the flow therethrough. The multiple lines and the restraints for those lines create clutter between the zipper manifold and the frac tree, which can make maintenance difficult and increase safety concerns. Each well configuration unit 101 typically includes a hydraulically actuated valve 102*a* and a manually actuated valve 102*b*. The well configuration units 101 of the zipper manifold 100 are connected together by zipper spools 104, and the final zipper spool 104 may be capped off or connected to other well configurations 101 as needed. The zipper manifold 100 connects to the output of the frac pump at the frac supply header 105.

In operation, the valves 102 of one well configuration unit 101 are opened to allow fluid flow to the corresponding frac tree 200 through its connection header 103 while the valves 102 of other well configuration units 101 in the zipper manifold 100 are closed. The valves 102 may be closed and opened to control the flow through different well configuration units 101 of the zipper manifold 100.

Figure 2:
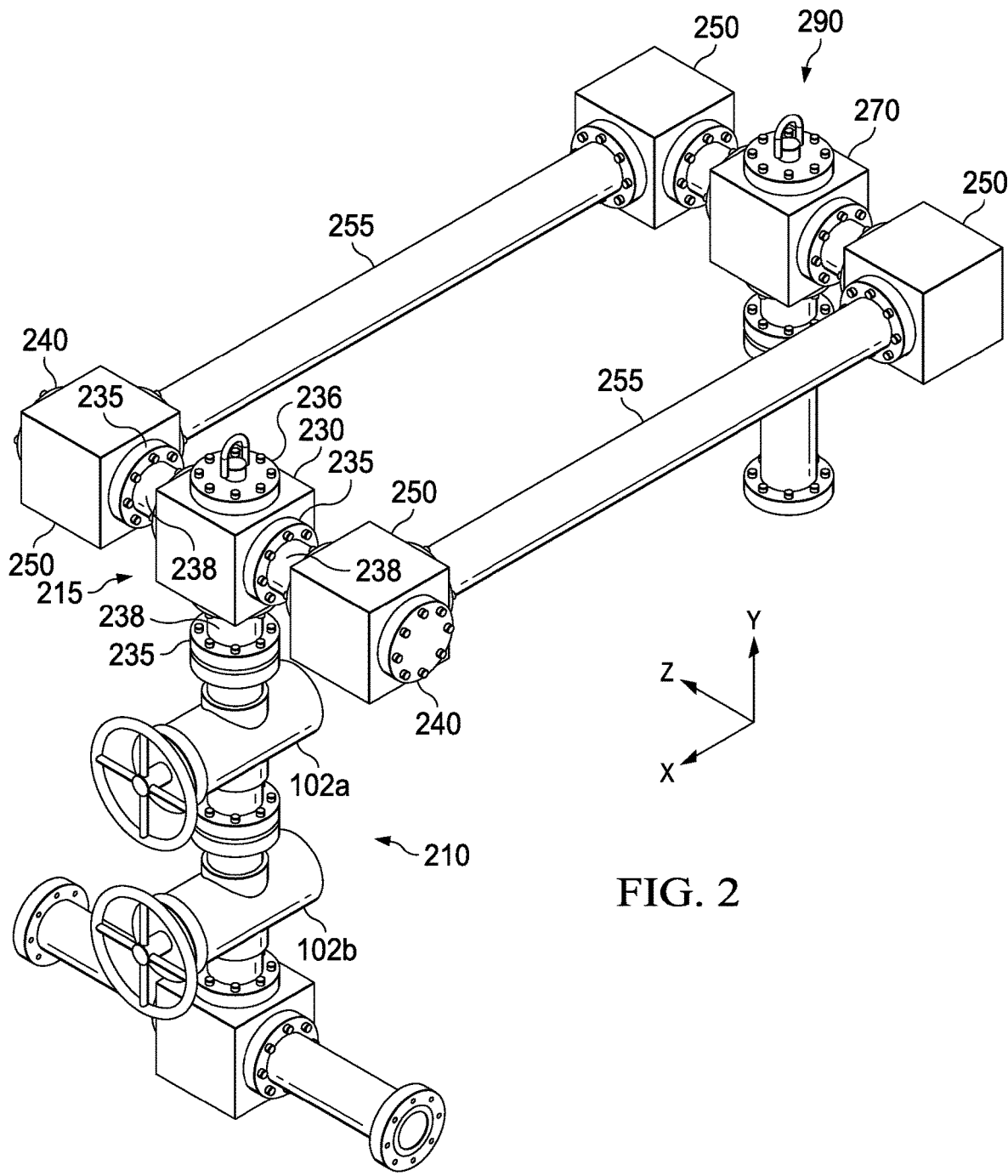
FIG. 2 illustrates one embodiment of an improved dual spool connection from a zipper manifold to a frac tree.

FIG. 2 illustrates an exemplary embodiment of a well configuration unit 210 with an improved bridge connector header 230. The bridge connector header 230, which connects to a frac tree, forms a "T" junction 215 with a short spool extending upward from valve 102a. The T-junction 215 of the bridge connector header 230 connects to two studded blocks 250. Each studded block 250 joins to a bridge spool 255 that connects similarly to studded blocks 250 and a frac tree header 270 on the frac tree.

Figure 3:
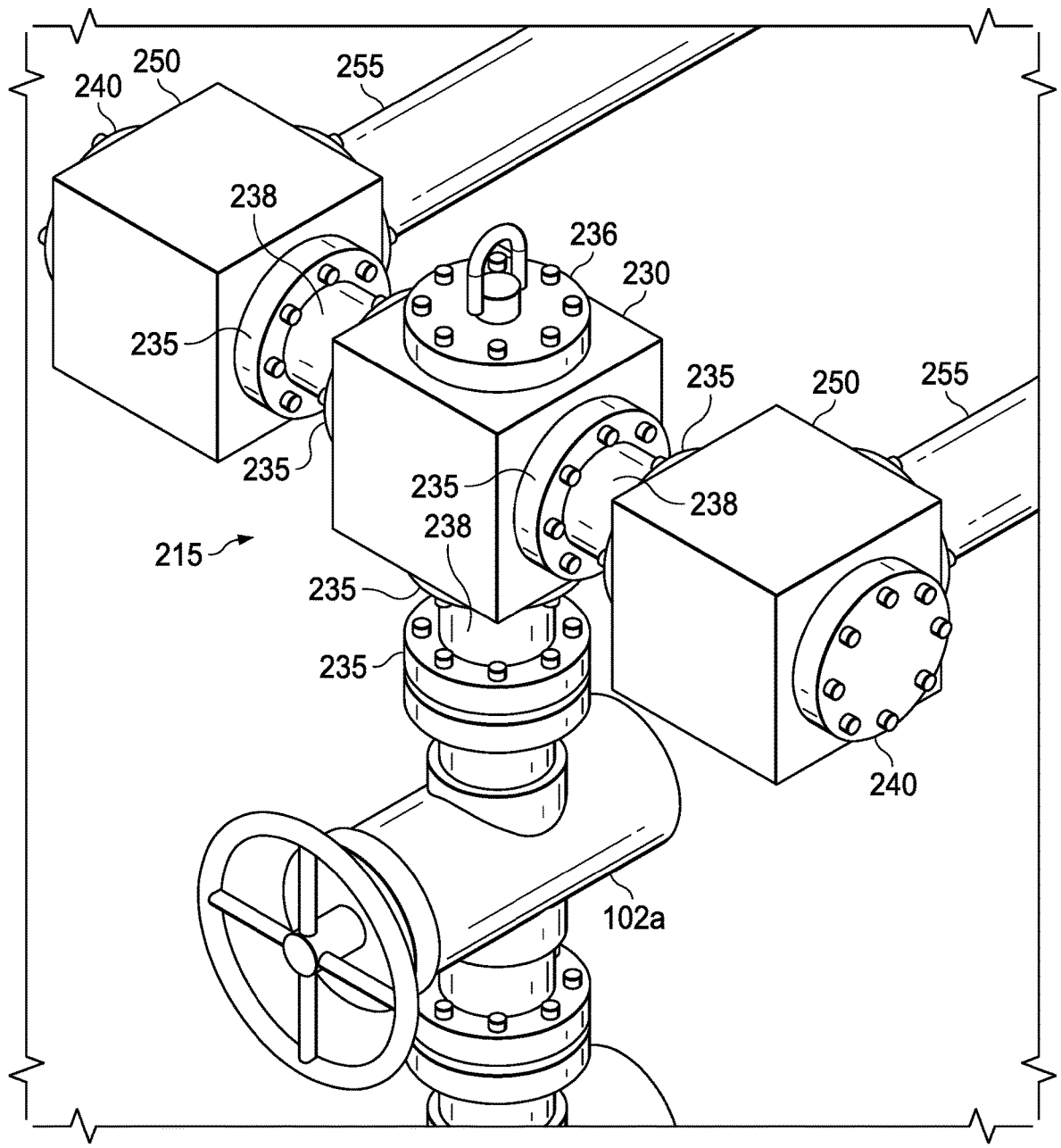
FIG. 3 illustrates the bridge connector header used in conjunction with one embodiment of the improved dual spool connection shown in FIG. 2.

As shown in more detail in FIG. 3, the bridge connector header 230 includes threaded flanges 235 on each side of the "T"—right, left, and bottom—connected via short spools 238. Blind flange 236 may be connected to the top side of bridge connector header 230. The threaded flanges 235, which are able to be rotated, are lined up with a corresponding flange or bolt holes during install. The threaded flanges 235 engage threads on the outer surface of the short spools 238, but the external threads include excess threading to allow for additional rotation of the threaded flange 235 to allow it to orient to the desired position. For example, the threaded flange 235 at the bottom of the T is aligned with a corresponding flange on the well configuration unit 210, and bolts are used to secure the flanges together. A studded block 250 is similarly joined to each of the right and left sides of the T-junction of the bridge connector header 230 via a short spool 238 and threaded flanges 235. Blind flange 240 may be connected to the side of studded block 250 that is opposite threaded flange 235.

The threaded flanges 235 allow the T-junction of the bridge connector header 230 and associated parts to be oriented into a desired configuration before final assembly of the bridge connector header 230. The threaded flange 235 at the bottom allows the bridge connector header 230 to be rotated about the central axis of the of the well configuration unit 210 (indicated in FIG. 2 as the y-axis), which may also be referred to as azimuthal rotation. Azimuthal rotation about the y-axis allows the entire T-junction, along with both bridge spools 255, to be laterally adjusted in order to accommodate a potential horizontal misalignment between bridge connection header 230 and frac tree header 270.

The threaded flanges 235 on the right and left sides of the T-junction allow bridge spools 255 to be rotated about the central axis running horizontally through the T-junction (indicated in FIG. 2 as the z-axis), which may also be referred to as vertical rotation. Vertical rotation about the z-axis allows the distal end of bridge spools 255 to be adjusted up or down to accommodate a potential vertical misalignment between bridge connection header 230 and frac tree header 270.

Internally, the T-junction splits the supply fluid flow to the two studded blocks 250, which are elbow shaped to route the flows to the bridge spools 255. The frac fluid travels through the bridge spools 255 to the studded blocks 250 on the frac tree side, and the two flows are rejoined at the frac tree header 270 of the frac tree 200. Significantly, when the two flow streams enter the frac tree header 270 of the frac tree 200, they enter from opposite directions. As a result, the velocity vectors of both streams will, to some degree, cancel each other out. This cancellation effect results in a lower velocity of the combined flow stream within frac tree 200, as compared to the velocity that would result from the use of a single spool connector.

In simulations performed by the applicant, the configuration shown in FIG. 2, with each bridge spool having a 5-inch inner diameter and an overall flow rate of 100 barrels per minute, the flow velocity in the upper portion of frac tree 200, immediately below T-junction 290, was in the range of 32-38 feet per second.

In a separate simulation, bridge spools 255 were replaced with a single bridge spool running in a straight line between bridge connector 230 and frac tree header 270. The single bridge spool was simulated with an inner diameter of 7 inches, such that it had the same cross-sectional area as the combination of bridge spools 255 (49 in$^2$ vs 50 in$^2$). At the same simulated rate of 100 barrels of fluid flow per minute, the flow velocities seen at the same point within frac tree 200 were significantly higher than the dual-spool configuration, generally exceeding 38 feet per second and in certain areas exceeding 45 feet per second.

The dual-spool configuration shown in FIG. 2 should also result in lower turbulence of the combined flow stream within frac tree 200. The lower velocity and lower turbulence should reduce the risk of erosion within frac tree 200, as compared to a flow stream within a single spool connector.

Figure 4A:
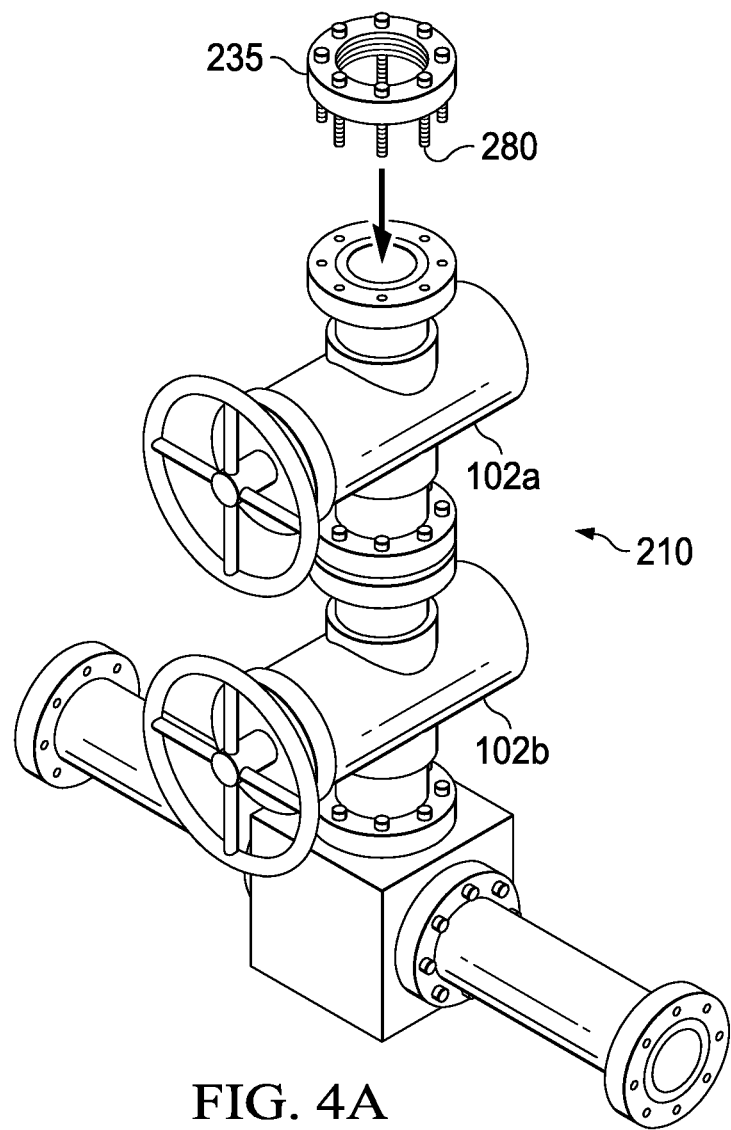
FIGS. 4A-4E illustrate one method of installing a short spool and threaded flange on the lower side of a T-junction.
Figure 4B:
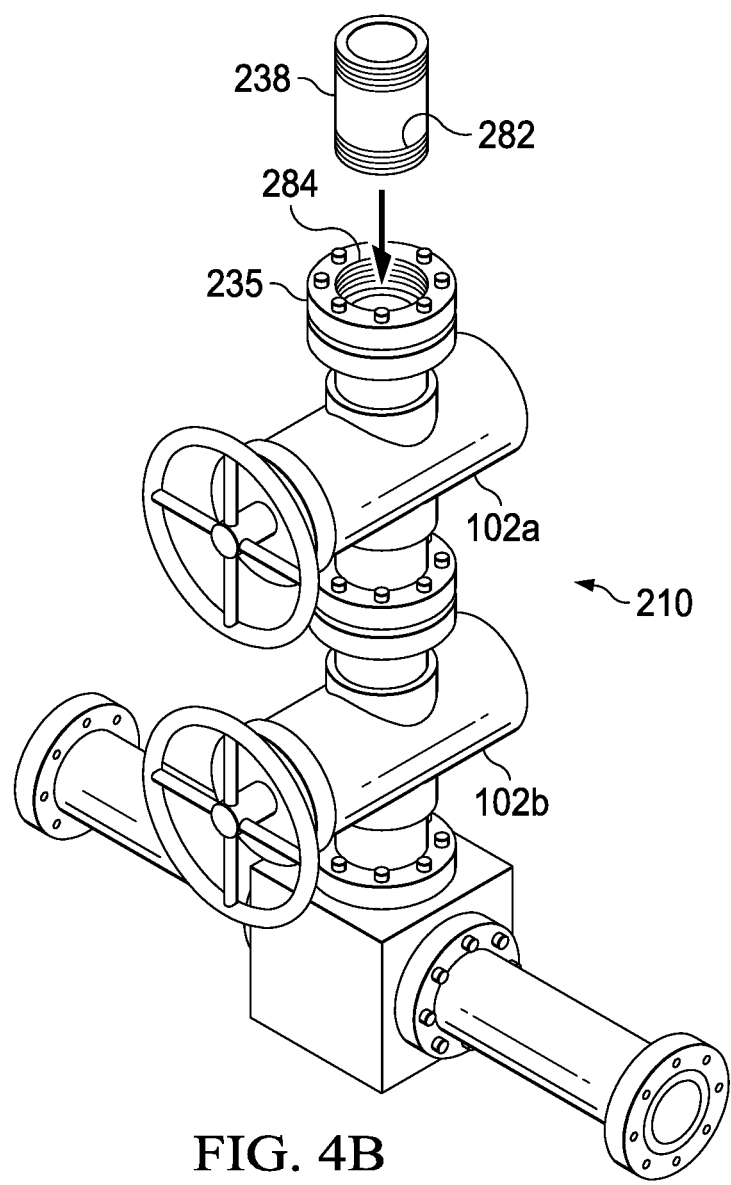
Figure 4C:
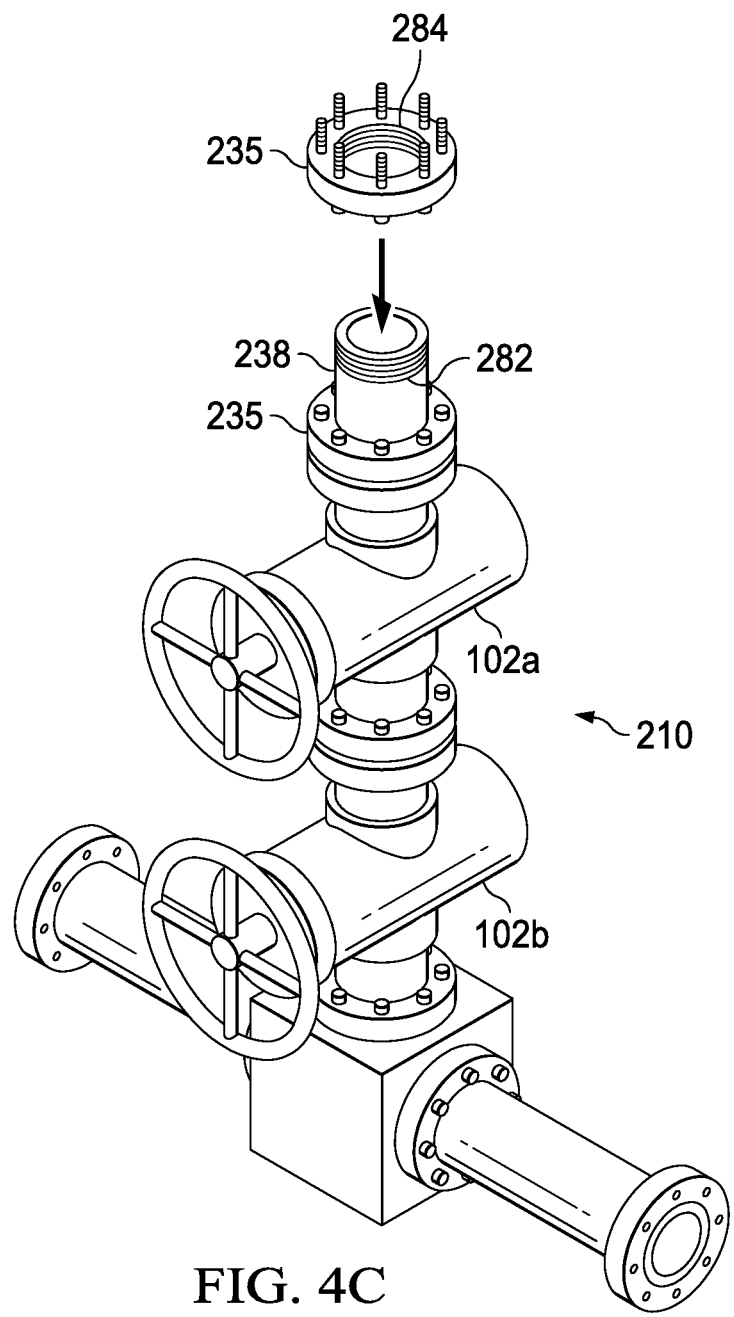
Figure 4D:
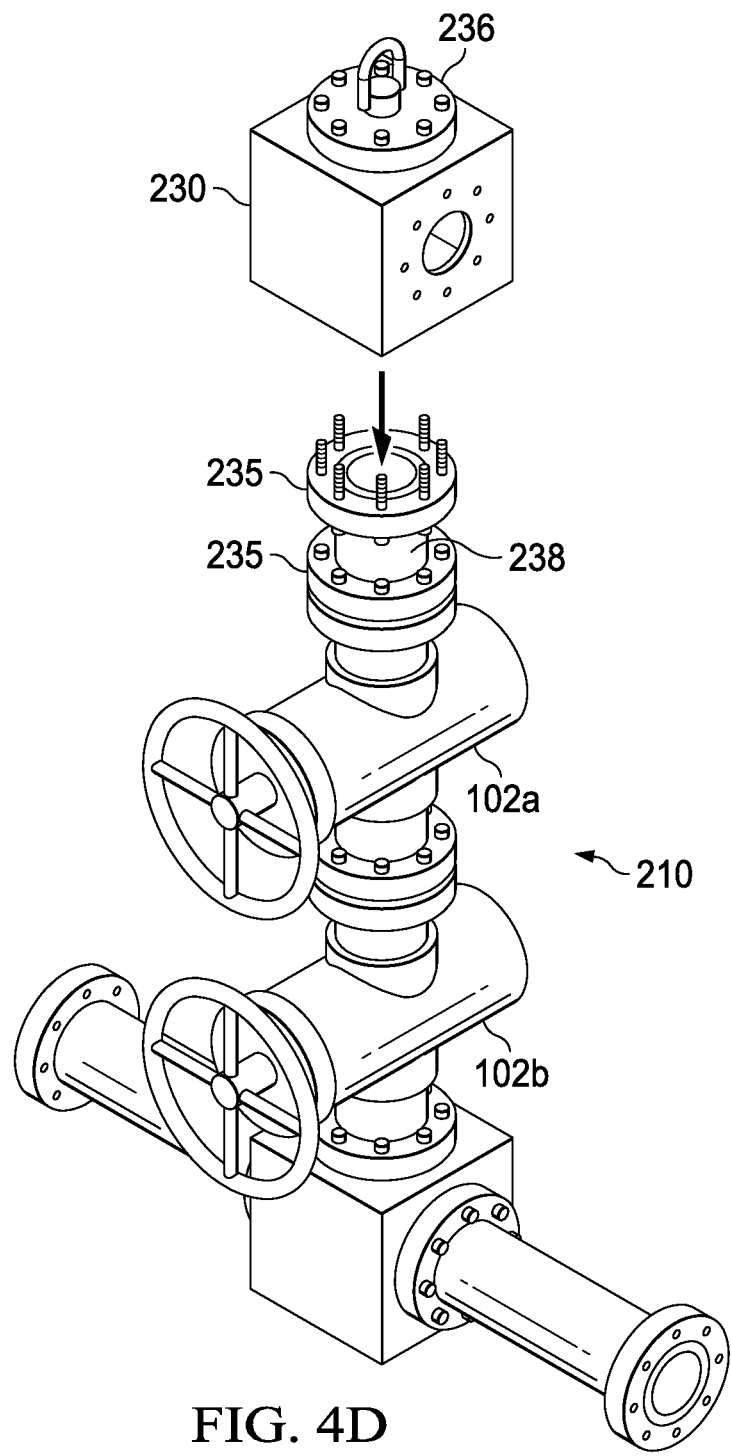
Figure 4E:
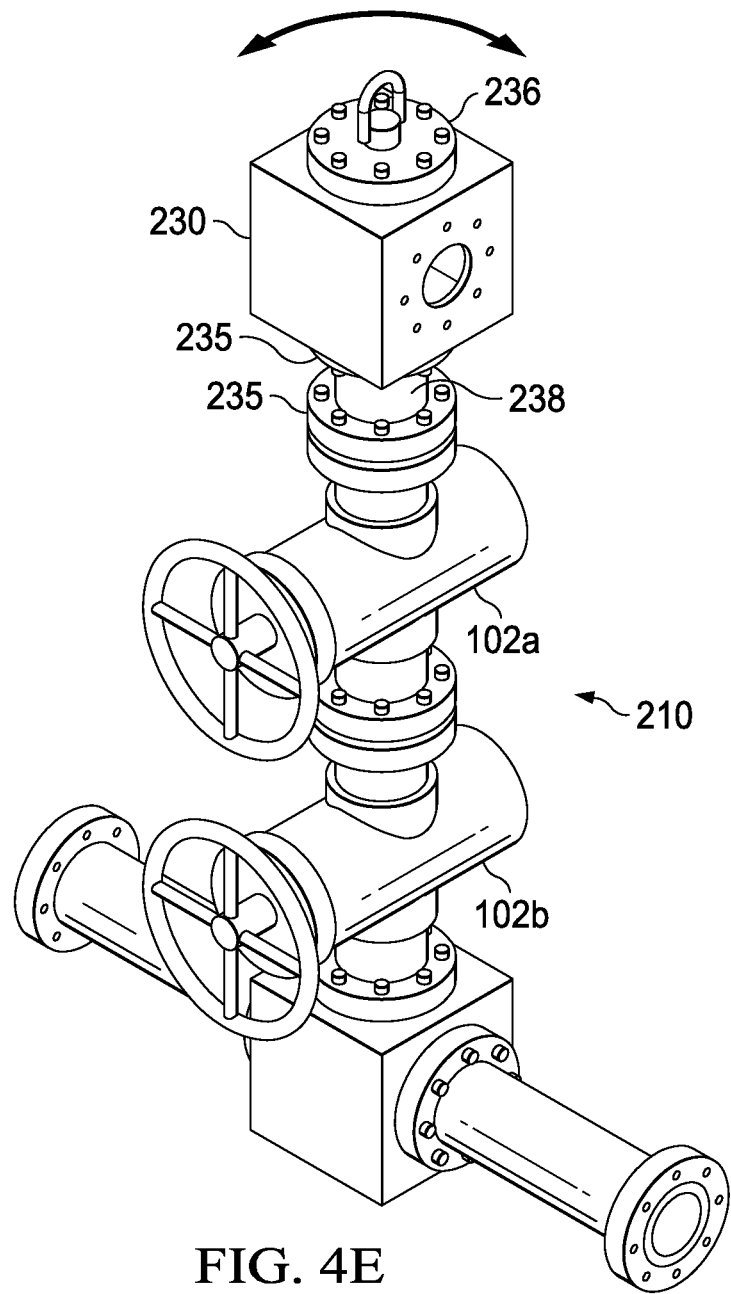

Installation of the improved connector bridge can be performed in several different ways. In one method, the first step in the installation process, as shown in FIG. 4A, is to securely attach lower threaded flange 235 to the top of well configuration unit 210, just above valve 102a, using bolts 280. Next, as shown in FIG. 4B, short spool 238 is attached to threaded flange 235 by rotating short spool 238 until the threaded portion 282 is fully engaged with the complementary threaded portion 284 of threaded flange 235. Next, as shown in FIG. 4C, upper threaded flange 235 is attached to short spool 238 by rotating upper threaded flange 235 until the threaded portion 284 is engaged with the complementary threaded portion 282 of short spool 238. Next, as shown in FIG. 4D, upper threaded flange 235 is attached to bridge connector header 230 using bolts 280. At this point, if necessary, bridge connector header 230 is rotated azimuthally about the y-axis, such that it aligns correctly with the frac tree to which the bridge spools are intended to connect. Such azimuthal rotation is accomplished by the threaded connection between upper threaded flange 235 and short spool 238, as shown in FIG. 4E. Once bridge connector header 230 is correctly aligned, all bolts and connections are securely tightened.

Figure 5A:
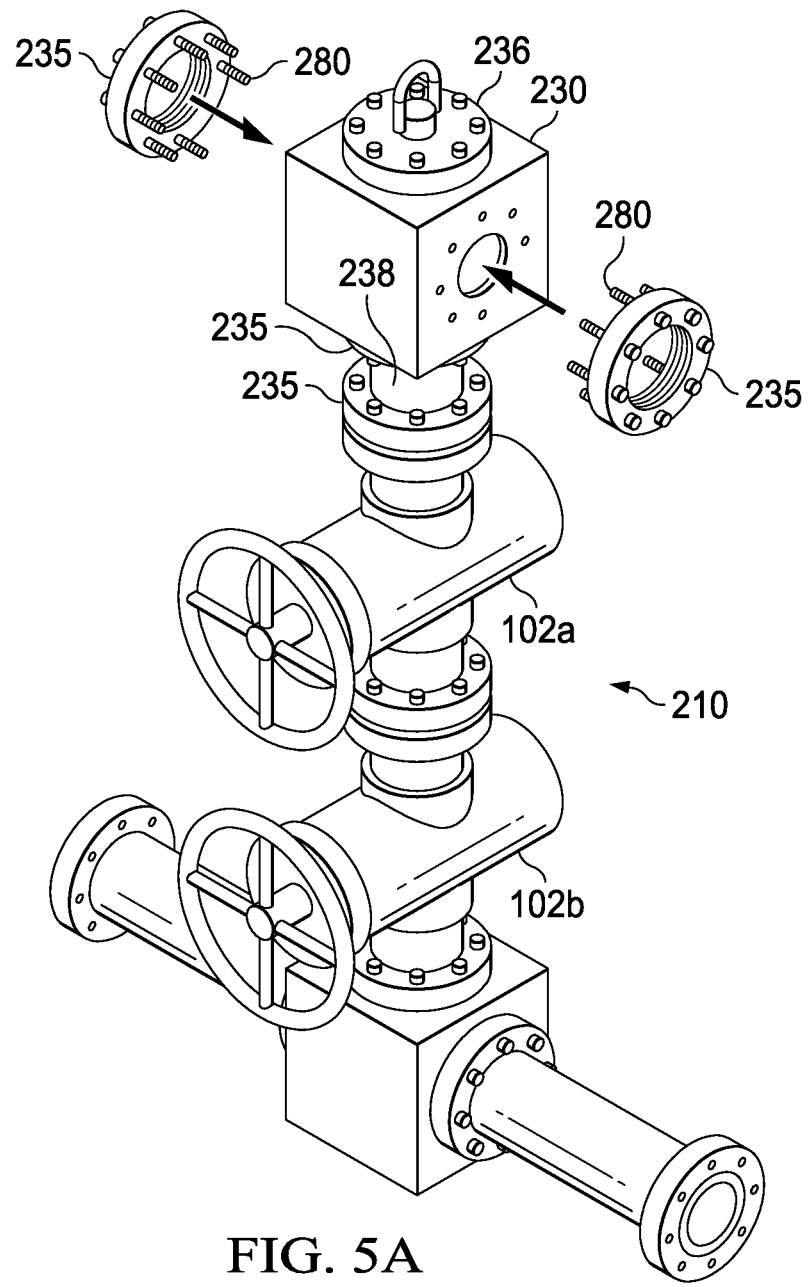
FIGS. 5A-5E illustrate one method of installing short spools, threaded flanges, and studded blocks on either side of the axial throughbore of a T-junction.
Figure 5B:
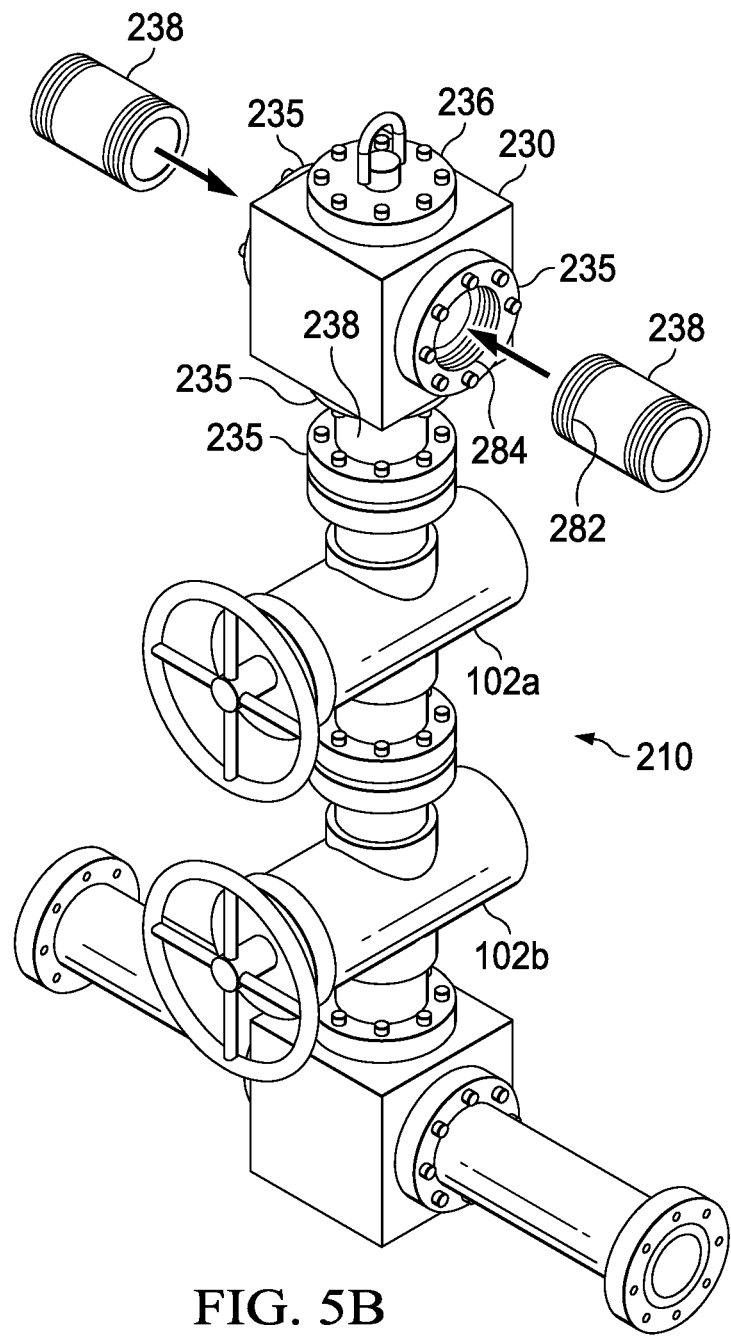
Figure 5C:
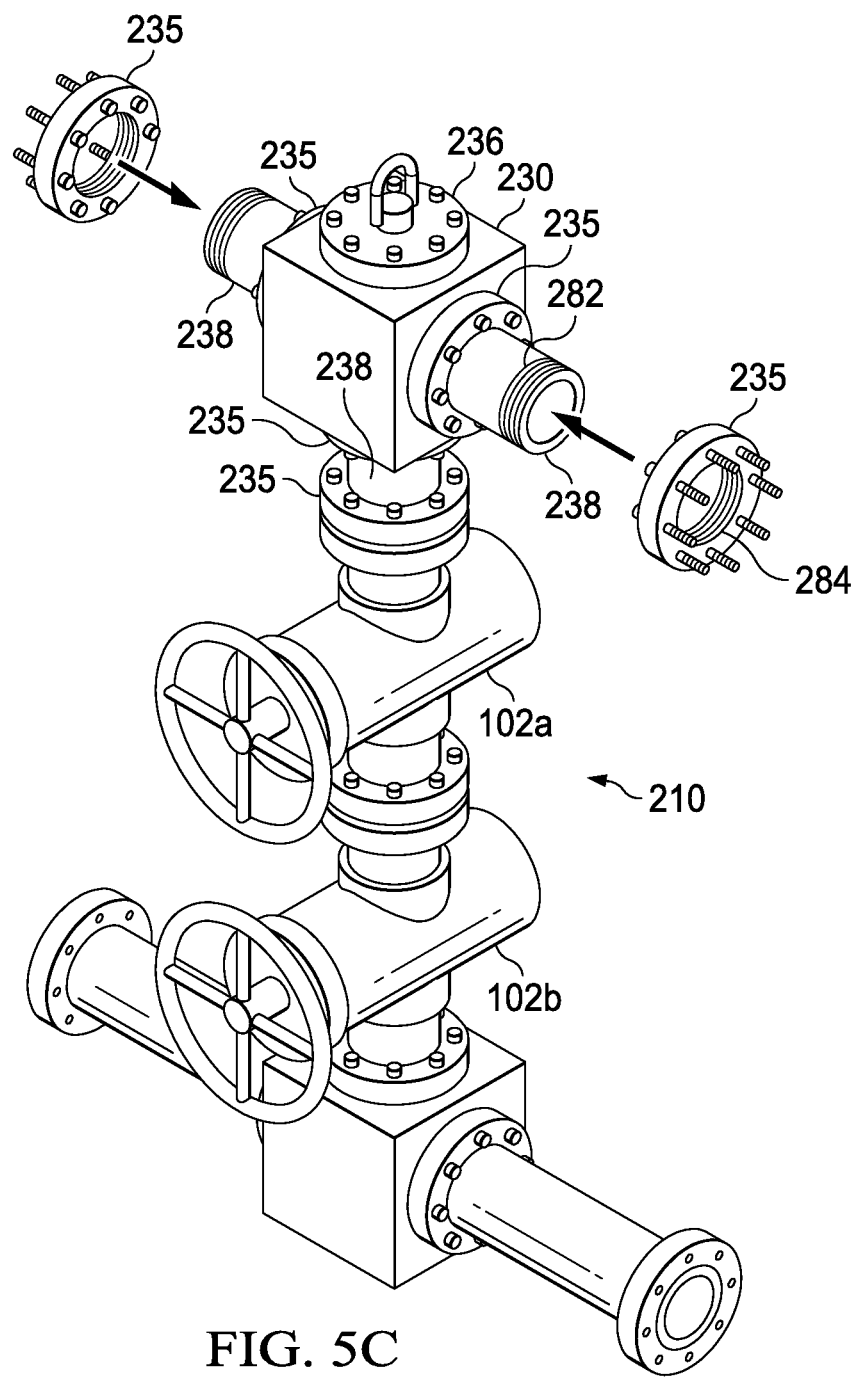
Figure 5D:
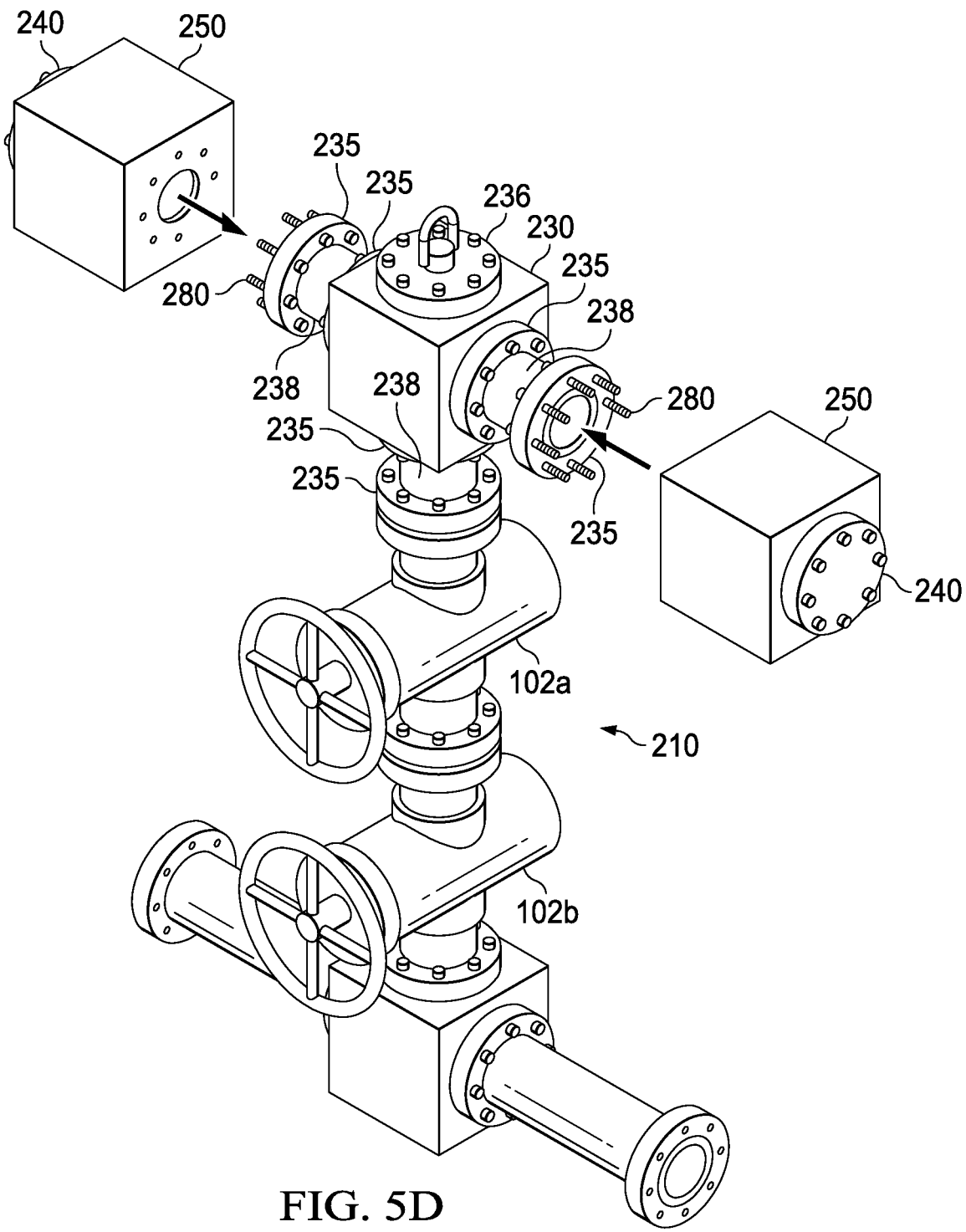
Figure 5E:
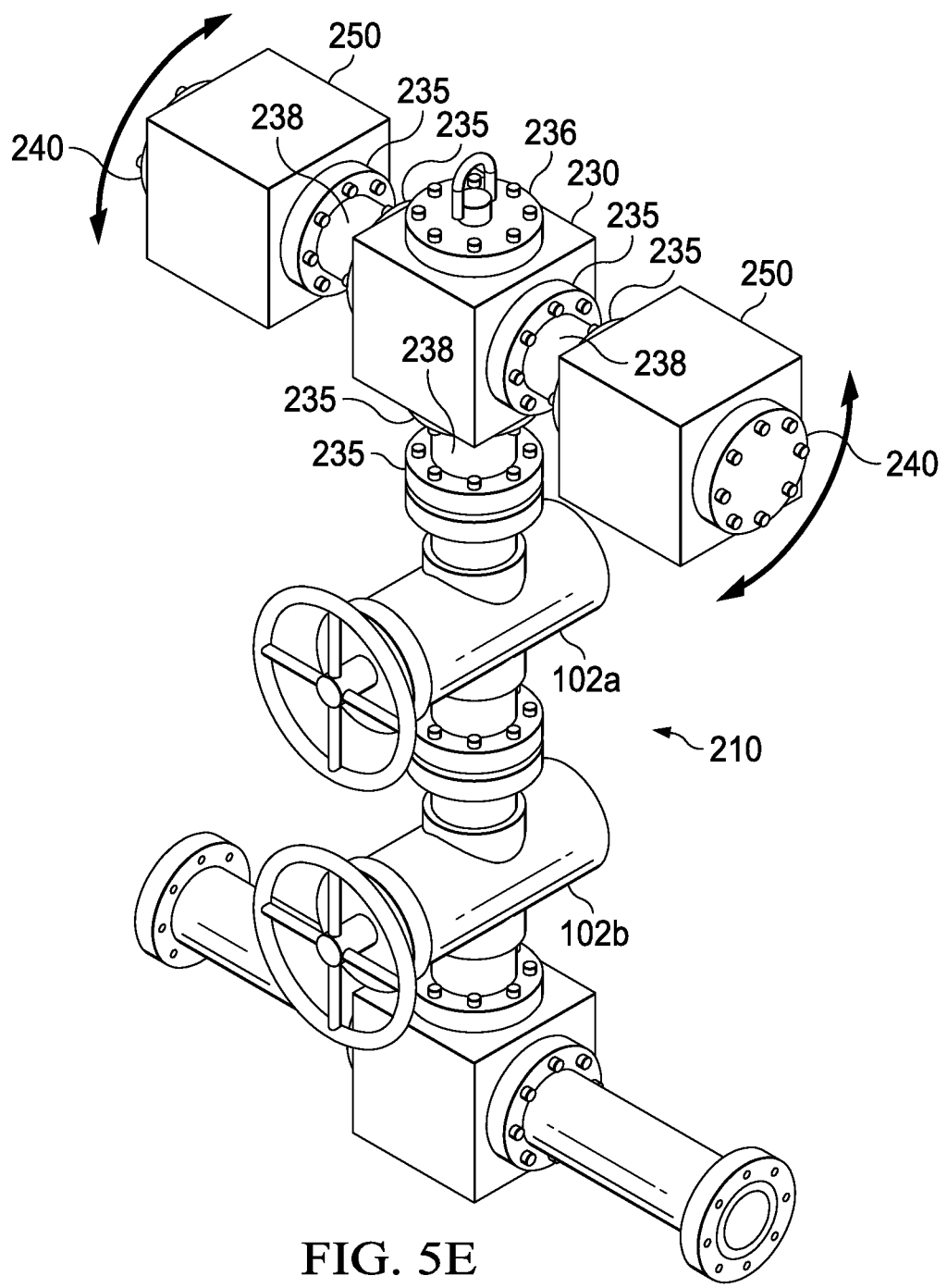

In this installation method, the next step, as shown in FIG. 5A, is to securely attach an inner threaded flange 235 on either side of bridge connector header 230, using bolts 280. Next, as shown in FIG. 5B, a short spool 238 is attached to each threaded flange 235 by rotating short spool 238 until the threaded portion 282 is fully engaged with the complementary threaded portion 284 of threaded flange 235. Next, as shown in FIG. 5C, an outer threaded flange 235 is attached to each short spool 238 by rotating outer threaded flange 235 until the threaded portion 284 is engaged with the complementary threaded portion 282 of short spool 238. Next, as shown in FIG. 5D, each outer threaded flange 235 is attached to a studded block 250 using bolts 280. At this point, if necessary, studded blocks 250 are rotated vertically about the z-axis, such that they align correctly with the studded blocks 250 on the frac tree to which the bridge spools are intended to connect. Such vertical rotation is accomplished by the threaded connection between outer threaded flanges 235 and short spools 238, as shown in FIG. 5E. Once studded blocks 250 are correctly aligned, all bolts and connections are securely tightened. During this stage of the installation process, bridge spools 255 may be attached to studded blocks 250 either before or after studded blocks 250 are attached to outer threaded flanges 235.

In another installation method, the bridge spools 255, studded blocks 250, bridge connector header 230, and frac tree header 270 may all be pre-assembled at the well site. A crane is used to lower the entire assembly onto the well configuration unit 210 and the frac tree 200, where it may be connected. If there are elevation differences between the bridge connector header 230 and the frac tree header 270, the rotating threaded flanges 235 may be used to adjust the elevation at either end.

The zipper bridge is superior to other methods of connecting the zipper manifold to the frac trees for multiple reasons. Because its orientation may be adjusted in one or both of the azimuthal and vertical directions, it can accommodate variations in the distance between and configuration of different frac manifolds and frac trees. Because it comprises two bridge spools, it does not require the multiple downlines used in many prior art systems. It is easier to install and more stable than other large-diameter hardline connections because its design is simpler and does not involve post-installation adjustments, and also because it is symmetrical about a line running from the well configuration unit to the frac tree. Because it comprises two flow lines that enter the frac tree header from opposite directions, it decreases the risk of erosion as compared to prior art systems using a single flow line.

Figure 6A:
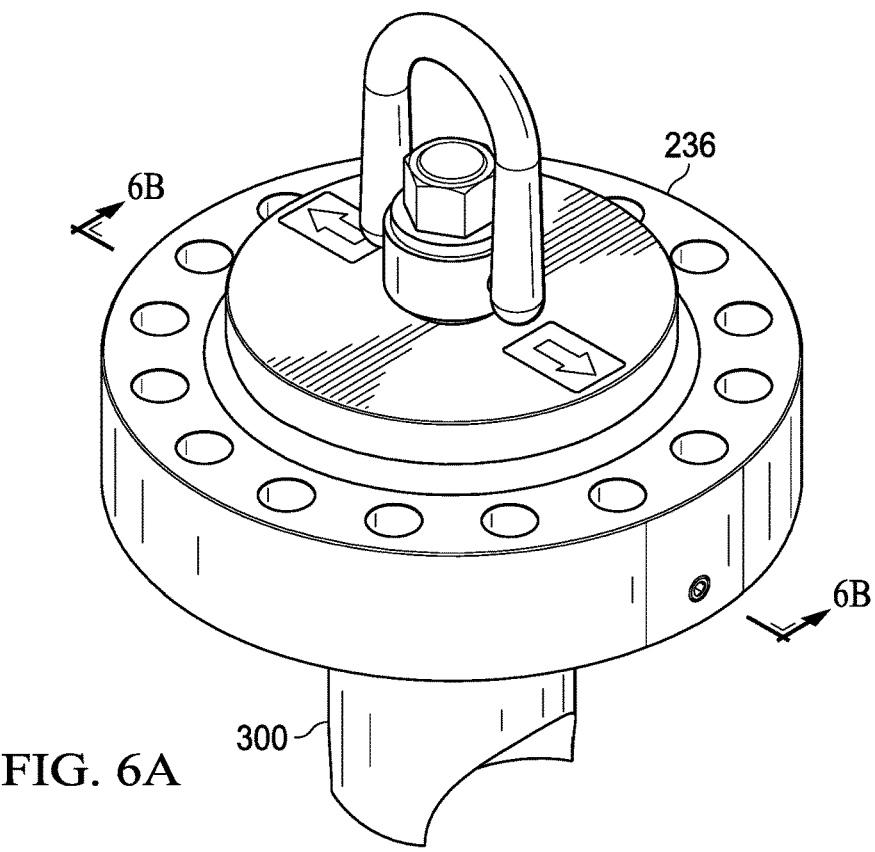
FIGS. 6A-6B illustrate a blind flange that may optionally be used to add a flow diverter to an improved dual spool connection from a zipper manifold to a frac tree.
Figure 6B:
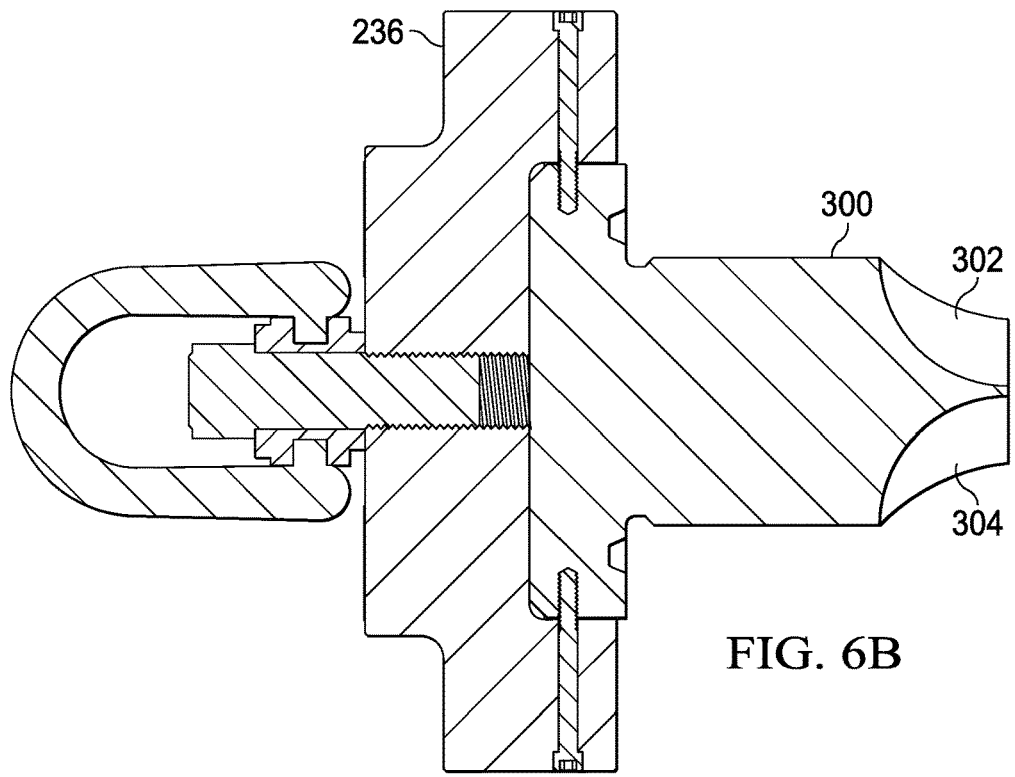
Figure 7A:
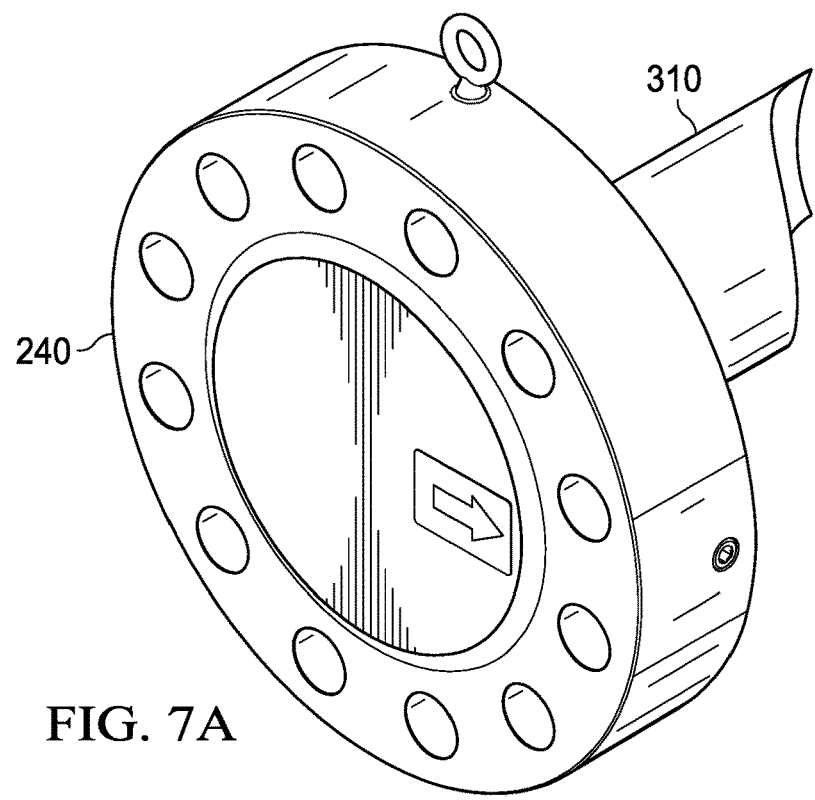
FIGS. 7A-7B illustrate another blind flange that may optionally be used to add one or more flow diverters at alternative points in the improved dual spool connection.
Figure 7B:
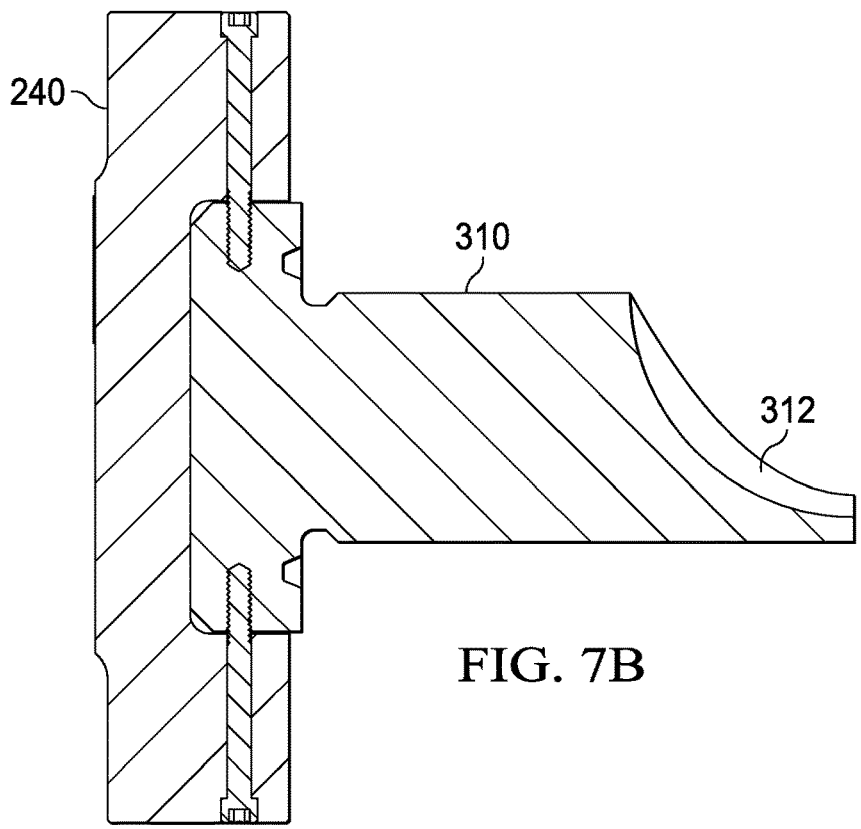
Figure 8:
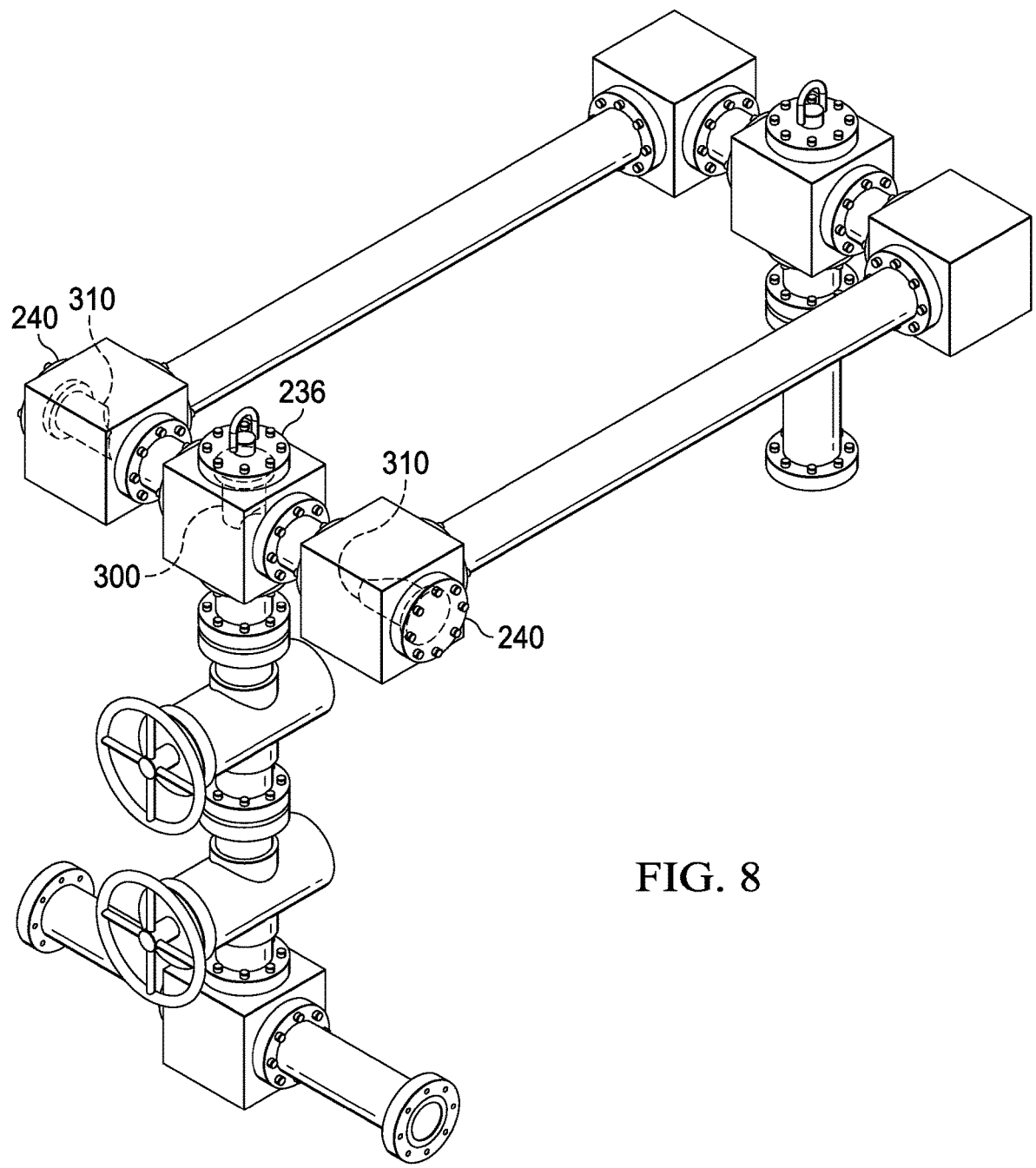
FIG. 8 illustrates an improved dual spool connection including both the blind flange of FIGS. 6A-6B and two of the blind flanges shown in FIGS. 7A-7B.

Optionally, the present invention may also include one or more diverters in the flow stream, as shown in FIG. 6A-8. Referring to FIG. 6A, an alternative embodiment of blind flange 236 may include flow diverter 300. As shown in FIG. 8, flow diverter 300 extends downward from blind flange 236, such that it is disposed within the flow of fracturing fluid from the frac manifold to the frac tree. Flow diverter 300 may be generally cylindrical with diverting surfaces 302 and 304. In this configuration, the central axis of flow diverter 300 may be substantially aligned with the central axis of short spool 238 which is connected to the bottom side of bridge connector header 230. This axis is shown as the y-axis in FIG. 2. Diverting surfaces 302 and 304 may be curvilinear and are preferably concave, as shown in FIG. 6A. Alternatively, diverting surfaces 302 and/or 304 may be convex, planar, or any other configuration. Flow diverter 300 may also comprise more or less than two diverting surfaces. For example, flow diverter 300 may be generally conical, such that it comprises one continuous diverting surface. In such a configuration, the generally conical diverting surface may also be concave, convex, planar, or any other configuration.

As fluid flows up through short spool 238 and into bridge connector header 230, the flow is along the y-axis, such that it is orthogonal to the z-axis, which passes through short spools 238 that lead away from bridge connector header 230 and towards studded blocks 250. As a result, the flow has a tendency to become turbulent as it shifts from the y-axis to the z-axis. This turbulence, as well as other dynamic flow characteristics of this configuration, can lead to increased erosion and premature failure of bridge connector header 230 and short spools 238.

With the installation of the alternative embodiment of blind flange 236 shown in FIG. 6A, the flow up through short spool 238 and into bridge connector header 230 will impact diverting surfaces 302 and 304. Diverting surfaces 302 and 304 will generally redirect a portion of the flow from the y-axis to the z-axis. This redirection may decrease the turbulence of the flow as it shifts from the y-axis to the z-axis, and thus decrease the erosion of bridge connection header 230 and short spools 238.

Referring now to FIG. 7A-7B, either or both blind flange 240 may include flow diverter 310, with diverting surface 312. Flow diverter 310 may be generally cylindrical with a central axis along the z-axis, as shown in FIG. 2. Diverting surface 312 may be curvilinear and is preferably concave. Alternatively, diverting surface may be convex, planar, or any other configuration. Flow diverter 310 may also have a plurality of diverting surfaces.

As fluid flows through short spools 238 and into studded blocks 250, it again shifts direction, this time from the z-axis to the x-axis, which is coaxial with bridge spools 255. This transition will also cause turbulence and thus the potential for erosion within studded blocks 250. With the use of the alternative embodiment of blind flange 240, as shown in FIG. 7A-7B, the flow along the z-axis will impact diverting surface 312, which will redirect a portion of the flow from the z-axis to the x-axis, and thus decrease the erosion of studded blocks 250.

Although flow diverters 300 and 310 may also experience erosion, replacement of blind flanges 236 and 240 is much easier and less expensive than replacing bridge connector header 230, short spools 238, and/or studded blocks 250.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

The invention claimed is:

1. A bridge connector for connecting a frac zipper manifold to a wellhead, comprising:
    a bridge connector header comprising:
        an axial throughbore having a first longitudinal axis;
        an input having a second longitudinal axis and in fluid communication with the axial throughbore; and
        a first flow diverter configured to divert some portion of fluid flowing along to the second longitudinal axis to flow along the first longitudinal axis;
    first and second connection blocks in fluid communication with the axial throughbore of the bridge connector header; and
    first and second bridge spools attached to, and in fluid communication with, the first and second connection blocks respectively, wherein
    the first and second bridge spools are both configured to connect the bridge connector header to the same wellhead.

2. The bridge connector of claim 1, wherein at least one of the first and second connection blocks comprises:
    a first bore having an axis coincident with the first longitudinal axis;
    a second bore in fluid communication with the first bore and having a third longitudinal axis; and
    a second flow diverter configured to divert some portion of fluid flowing along the first longitudinal axis to flow along the third longitudinal axis.

3. The bridge connector of claim 2, wherein the first and second bridge spools have an axis coincident with the third longitudinal axis.

4. The bridge connector of claim 1, wherein the first flow diverter comprises first and second diverting surfaces.

5. The bridge connector of claim 4, wherein at least one of the first and second diverting surfaces is curvilinear.

6. The bridge connector of claim 5, wherein the curvilinear diverting surface is concave.

7. The bridge connector of claim 1, wherein the first flow diverter comprises a conical diverting surface.

8. A method for conducting hydraulic fracturing operations through a wellhead, comprising the following steps:
    providing a frac zipper manifold comprising:
        a spool configured to allow axial flow of fracturing fluid; and
        an outlet configured to selectively allow flow of fracturing fluid to a bridge connector;
    providing a bridge connector header comprising:
        an axial throughbore having a first longitudinal axis;
        an input having a second longitudinal axis and in fluid communication with the axial throughbore; and
        a first flow diverter configured to divert some portion of fluid flowing along to the second longitudinal axis to flow along the first longitudinal axis;
    configuring the bridge connector header such that the input is in fluid communication with the outlet of the frac zipper manifold;
    configuring first and second connection blocks such that they are in fluid communication with the axial throughbore of the bridge connector header;
    attaching first and second bridge spools to the first and second connection blocks respectively, wherein the first and second bridge spools are both configured to connect the bridge connector header to the same wellhead; and
    causing fluid to flow through the outlet of the frac zipper manifold, such that said fluid flows into the input of the bridge connector header along the second longitudinal axis and is diverted by the first flow diverter to flow along the first longitudinal axis.

9. The method of claim 8, wherein at least one of the first and second connection blocks comprises:
    a first bore having an axis coincident with the first longitudinal axis;
    a second bore in fluid communication with the first bore and having a third longitudinal axis; and
    a second flow diverter configured to divert some portion of fluid flowing along the first longitudinal axis to flow along the third longitudinal axis.

10. The method of claim 9, further comprising causing fluid to flow through the first bore along the first longitudinal axis, such that said fluid is diverted by the second flow diverter to flow through the second bore along the third longitudinal axis.

11. The method of claim 8, wherein the first flow diverter comprises first and second diverting surfaces.

12. The method of claim 11, wherein at least one of the first and second diverting surfaces is curvilinear.

13. The method of claim 12, wherein the curvilinear diverting surface is concave.

14. The method of claim 8, wherein the first flow diverter comprises a conical diverting surface.

* * * * *